April 13, 1926. 1,580,937
J. WERZ
POWER TRANSMISSION DEVICE
Filed Nov. 14, 1924
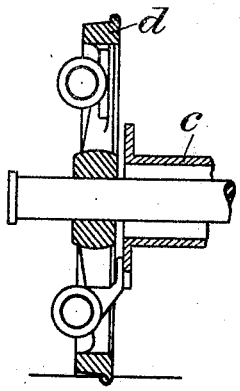
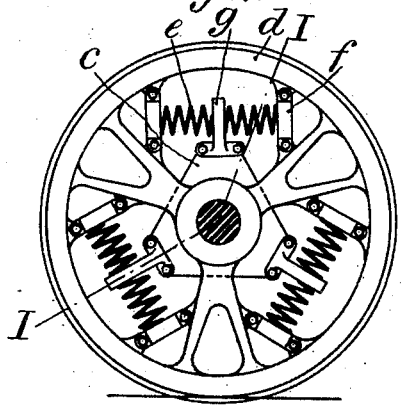 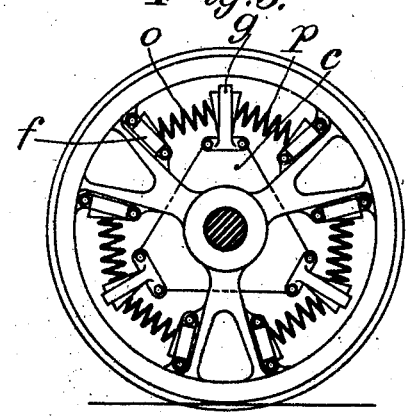
Inventor
Jacob Werz
By
his Attorneys.

Patented Apr. 13, 1926.

1,580,937

UNITED STATES PATENT OFFICE.

JACOB WERZ, OF GENEVA, SWITZERLAND, ASSIGNOR OF ONE-HALF TO SOCIÉTÉ ANONYME DES ATELIERS DE SÉCHERON, OF GENEVA, SWITZERLAND, A CORPORATION OF SWITZERLAND.

POWER-TRANSMISSION DEVICE.

Application filed November 14, 1924. Serial No. 749,958.

*To all whom it may concern:*

Be it known that I, JACOB WERZ, a citizen of Switzerland, residing at Geneva, Canton of Geneva, in the Confederation of Switzerland, have invented certain new and useful Improvements in or Relating to Power-Transmission Devices, of which the following is a specification.

This invention relates to spring devices for power transmission from a hollow shaft or quill to a vehicle wheel, more particularly for electric vehicles. The novel feature consists in using for the power transmission rigidly mounted spring elements arranged in the form of a triangle.

It has been already suggested to arrange the spring elements in the form of a triangle, but the springs are hinged. As the springs are to be movable in any direction (for instance by means of ball and socket joints), a more or less complicated construction necessarily results. Moreover, it is impossible to avoid encroaching upon available space so that only short springs can be mounted which are exposed to heavy strains. Another drawback of this well-known construction is that springs hinged at the ends, are exposed during the working to much more unfavourable stresses owing to the action of centrifugal force, than springs rigidly mounted at the ends.

Further, it has been also proposed to use for the transmission of power from a hollow shaft to a vehicle driving wheel, spring devices comprising rigidly mounted springs which, however, owing to the method of mounting them and to their arrangement can only be short, and therefore are exposed to heavy stresses, in the same way as the hinged springs arranged in the form of a triangle.

As according to the present invention the spring elements arranged in a triangle are rigidly mounted, or the rigidly mounted spring elements are arranged in a triangle, it becomes possible to use longer spring elements than those hitherto employed, the spring elements therefore being exposed to less heavy strains. Moreover, the necessity of lubricating the spring seats in the case of hinged springs, is done away with.

Two constructions of the spring device according to the invention are diagrammatically illustrated by way of example in the accompanying drawing.

Figure 1 is a sectional view of the first construction on line I—I of Figure 2.

Figure 2 is a front elevation of said construction.

Figure 3 is a front elevation of the second construction.

The construction shown in Figures 1 and 2 has three spring drive elements which are arranged approximately on the three sides of an equilateral triangle round the hollow shaft $c$. Each spring drive element comprises a single helical spring $e$ which is secured in two outer rigid supports $f$ and in a rigid central support $g$, the axis of the spring $e$ being a straight line. The supports $f$ are rigidly secured to the driving wheel $d$, and the central support $g$ is rigidly secured to the hollow shaft $c$. The springs $e$ can be rigidly secured to the supports in any suitable manner, for instance by being screwed into them.

The rotation of the hollow shaft $c$ in any desired direction is produced by the transmission of power through the helical springs $e$, thus the spires of the spring on one side of the central support $g$ will be working in compression and those on the other side, in tension.

It will be understood that the particular form and arrangement of the springs as illustrated and hereinbefore described are merely illustrative of my invention, because obviously, the number and particular arrangement of the springs may be varied without departing from the nature and spirit of the invention. It will furthermore be understood that while the invention is particularly adapted for use in electric motor vehicles, its use is in no way so limited as it may be employed for other and equivalent purposes.

What I claim is:

A power transmission device comprising a hollow shaft, a wheel, pairs of sockets secured in spaced positions in the said wheel, a plurality of sockets fixed to the said shaft, each of the last aforesaid sockets being located normally substantially midway between a pair of the first aforesaid sockets, and springs extending between the said sockets and having their ends fixed therein, the axes of the said springs being arranged in the form of a triangle.

In testimony whereof I have affixed my signature.

JACOB WERZ.